United States Patent [19]
Terpstra

[11] Patent Number: 5,181,448
[45] Date of Patent: Jan. 26, 1993

[54] MITER SAW APPARATUS WITH ADJUSTABLE WORKPIECE SUPPORTING FENCE

[75] Inventor: Daniel A. Terpstra, Kirkwood, Mo.

[73] Assignee: Emerson Electric Co., St. Louis, Mo.

[21] Appl. No.: 811,227

[22] Filed: Dec. 20, 1991

[51] Int. Cl.$^5$ .............................................. B27B 27/06
[52] U.S. Cl. .................. 83/468.3; 83/468.7; 83/471.3; 83/490; 83/581
[58] Field of Search ................ 83/468.3, 468.7, 471.3, 83/478, 490, 391, 393, 397, 581

[56] References Cited

U.S. PATENT DOCUMENTS

| | | | |
|---|---|---|---|
| 4,211,134 | 7/1980 | Thorsell et al. | 83/471.3 |
| 4,452,117 | 6/1984 | Brickner et al. | 83/468.3 X |
| 4,638,700 | 1/1987 | Fushiya et al. | 83/471.3 X |
| 4,934,233 | 6/1990 | Brundage | 83/397 |
| 5,042,348 | 8/1991 | Brundage | 83/471.3 |
| 5,063,805 | 11/1991 | Brundage | 83/468.3 |

*Primary Examiner*—Frank T. Yost
*Assistant Examiner*—Clark F. Dexter
*Attorney, Agent, or Firm*—Polster, Lieder, Woodruff & Lucchesi

[57] ABSTRACT

A miter saw is constructed to move a workpiece supporting fence between rearward and forward longitudinal positions relative to a saw blade, as well as the automatic transverse movement of the workpiece supporting fence relative to the saw blade as a turntable is rotated to selected miter positions. The workpiece supporting fence includes a T-shaped slot in fence supporting sections thereof and a pair of downwardly directed pins fixed to the underside of the workpiece supporting fence. A fence lock extends through the longitudinal portion of the T-shaped slot, to enable the fence to be moved between its forward and rearward position. The fence lock engages the fence in a repeatable and controllable locking action. The downwardly directed pins are positioned within a pair of generally parallel openings in the turntable, there being one opening on each side of a saw blade slot. When the workpiece supporting fence is in its rearward position, one of the pins engages peripheral areas adjacent a curvilinear portion of its associated opening in order to move the fence from side-to-side as the turntable is rotated for selected miter cuts. When the workpiece supporting fence is in its forward position and the turntable is rotated, the opening moves relative to the pins, without engagement therewith. Thus, no relative transverse movement of the fence to the saw blade is required when the fence is in the forward position.

22 Claims, 9 Drawing Sheets

FIG. I.

MITER SAW APPARATUS WITH ADJUSTABLE WORKPIECE SUPPORTING FENCE

CROSS REFERENCE TO RELATED APPLICATIONS

This invention is related to U.S. Pat. No. 5,063,805 entitled MITER SAW APPARATUS and U.S. Pat. Nos. 4,934,233 and 5,042,348, entitled COMPOUND MITER SAW, all of which are assigned to the same assignee as the present invention. The above referred to patents are incorporated herein by reference.

BACKGROUND OF THE INVENTION

The present invention is related to miter saws including compound miter saws, and in particular, to a miter saw having a workpiece supporting fence which has adjustable longitudinal movement and automatically adjustable transverse movement for saw blade as the blade is rotated to various miter positions.

The above mentioned patents disclose a number of improvements to compound miter saws. One of the improvements includes a workpiece supporting fence that is maintained in alignment with a turntable saw blade slot, as the saw blade and the turntable, with its included saw blade slot, are rotated to make desired miter cuts. Thus, as the saw blade and turntable are rotated, the workpiece supporting fence moves from side-to-side in order to keep a workpiece supporting fence cutout in line with the blade. If the fence were not so moved, it would have to be cutout sufficiently so as to not interfere with the blade at its various miter angles. This would require the use of more material, if the same fence strength were to be kept, thus making the saw more expensive to produce.

The first above-mentioned U.S. Pat. No. 5,063,805 is directed to an 8¼" saw wherein the workpiece supporting fence is permanently positioned behind the centerline of the turntable. The disclosed means for automatically moving the workpiece supporting fence as set forth in that patent works for its intended use. However, when the workpiece supporting fence is permanently positioned behind the center line of the turntable on the 8¼" saw, the fence is always moved as the turntable is rotated. Thus, it will not work as well on a 10" miter saw in which the fence is desirably moved between a rearward position, behind the centerline of the turntable where the fence needs the side-to-side adjustment, and a forward position, on the centerline of the turntable, where the side-to-side adjustment is not needed.

Both U.S. Pat. No. 4,934,233 and 5,043,348 are directed to a 10" compound miter saw. In the construction shown in both these patents, there are some problems in moving the fence when it is in its rearward position. These problems include maintaining proper clearance to the saw blade, the strength of the part that moves the fence and its ability to handle abuse, and the added complexity in the design of mating parts. Further, in order to move the fence between a forward and a rearward position, the fence has to be totally removed from the table and re-affixed to the table in its desired position.

The present invention provides an improved workpiece supporting fence with adjustable longitudinal movement and automatically adjustable transverse movement relative to the saw blade which operates in a manner not heretofore contemplated by the prior art, as will be discussed in detail below.

SUMMARY OF THE INVENTION

Among the several objects and advantages of the present invention include:

The provision of a new and improved compound miter saw which overcomes the deficiencies of the aforementioned prior art constructions;

The provision of the aforementioned compound miter saw which provides adjustable longitudinal movement of a workpiece supporting fence relative to a saw blade, in order to move the saw between forward and rearward positions, and automatically adjustable transverse movement of the workpiece supporting fence relative to the saw blade;

The provision of the aforementioned compound miter saw wherein the fence is automatically transversely moved to maintain the fence in a predetermined position relative to a saw blade slot in a turntable, as the turntable and included saw blade slot are rotated to various miter cut positions; and The provision of the aforementioned compound miter saw which has a workpiece supporting fence that does not need to be removed from a supporting table in order to re-position or move the fence between a rearward and forward position.

The provision of the aforementioned compound miter saw which is portable; simple to operate; relatively inexpensive to manufacture; durable and long lasting; and otherwise well adapted for the purposes intended.

In accordance with the invention, generally stated, there is provided a compound miter saw apparatus comprising a supporting frame, a turntable selectively rotatably mounted on the supporting frame, and a power driven saw blade pivotally mounted on the turntable. The turntable includes a saw blade slot which receives the power driven saw blade therein. A workpiece supporting fence is mounted on the supporting frame and includes a pair of workpiece engaging surfaces aligned with respect to one another across the saw blade slot. The workpiece supporting fence further includes means for longitudinally moving the workpiece supporting fence between a forward and rearward position. It also includes means, in conjunction with the turntable, for simultaneously transversely moving the fence relative to the power driven saw blade so as to maintain the workpiece supporting fence in a predetermined position relative to the power driven saw blade as the turntable and included power driven saw blade are selectively rotated on the supporting frame to various desired miter positions.

The workpiece supporting fence further includes a fence supporting section for each workpiece engaging surface. Each fence supporting section include a T-shaped slot which receives a fence lock and which, in turn, is received in a bore in the supporting frame. A sloped wall adjacent each T-shaped slot, engages a beveled surface on a clamp of each fence lock. The interaction of the two sloped surfaces counteracts the pressure applied against the workpiece supporting fence as a workpiece is urged against the fence during use, and further forces the fence into a repeatable controlled position relative to the saw blade.

A pair of downwardly extending pins fixed to the underside of the workpiece supporting fence engage peripheral areas adjacent slots in the turntable. Each of the slots includes a wide lower portion, an inwardly directed curvilinear portion at the top of the lower portion which extends above the saw blade slot and an inwardly directed stub portion at the top of the lower portion and to the inside of the curvilinear portion. The fence pins, in conjunction with the peripheral areas adjacent the turntable slots, comprise the transverse moving means. The pins engage the peripheral areas adjacent the slots such that when the fence is in its rearward position one of the pins engages peripheral areas adjacent its associated curvilinear slot to transversely move the fence as the turntable is rotated. When the fence is in its forward position, the pins are free from engaging associated slots such that there is no transverse movement of the fence as the turntable is rotated.

An elongated transverse portion of the T-shaped slot defines a path along which the fence moves as the turntable is rotated, when the fence is in a rearward position.

A longitudinal portion of the T-shaped slot allows the fence to be moved between a forward and rearward position.

These and other objects will become apparent to those skilled in the art in light of the following disclosure and accompanying drawings.

BRIEF DESCRIPTION OF THE DRAWINGS

In the drawings.

Similar reference characters identify similar parts throughout the several figures of the drawings.

DESCRIPTION OF THE PREFERRED EMBODIMENT

The following detailed description illustrates the invention by way of example and not by way of limitation. This description will clearly enable one skilled in the art to make and use the invention, and describes several embodiments, adaptions, variations, alternatives and uses of the invention, including what I presently believe is the best mode of carrying out the invention.

Many of the components of the present invention are similar to those disclosed in aforementioned U.S. patents. Therefore, before discussing the specific features of the present invention, a general understanding of the principal components of the compound miter saw and the manner in which they cooperate to achieve the desired miter/bevel cuts in workpieces will be explained, in order to provide a background setting for the features of the present invention.

Figure 1:
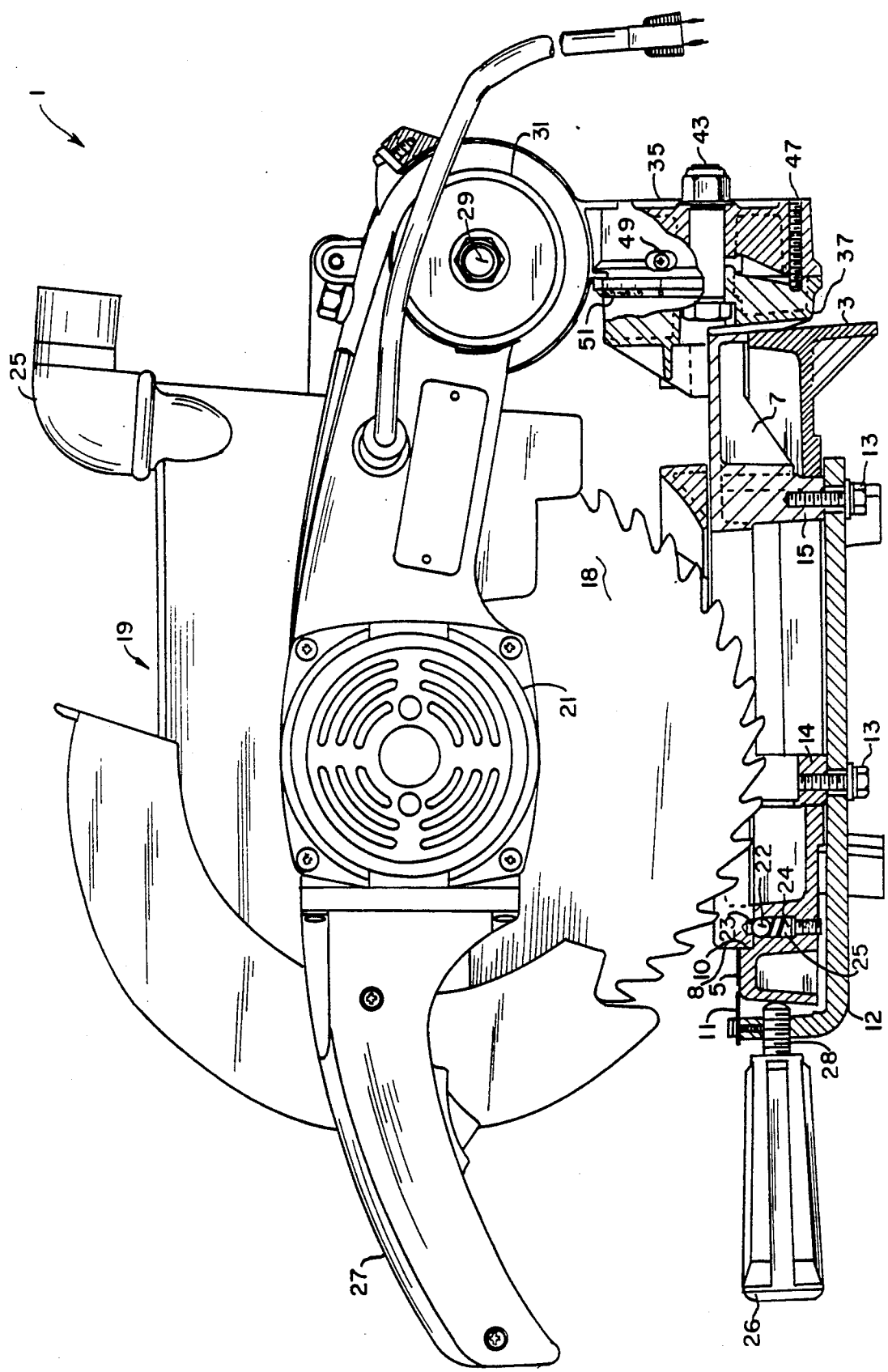
FIG. 1 is a right side elevational view, partially in cross-section, of the compound miter saw of the present invention.
Figure 2:
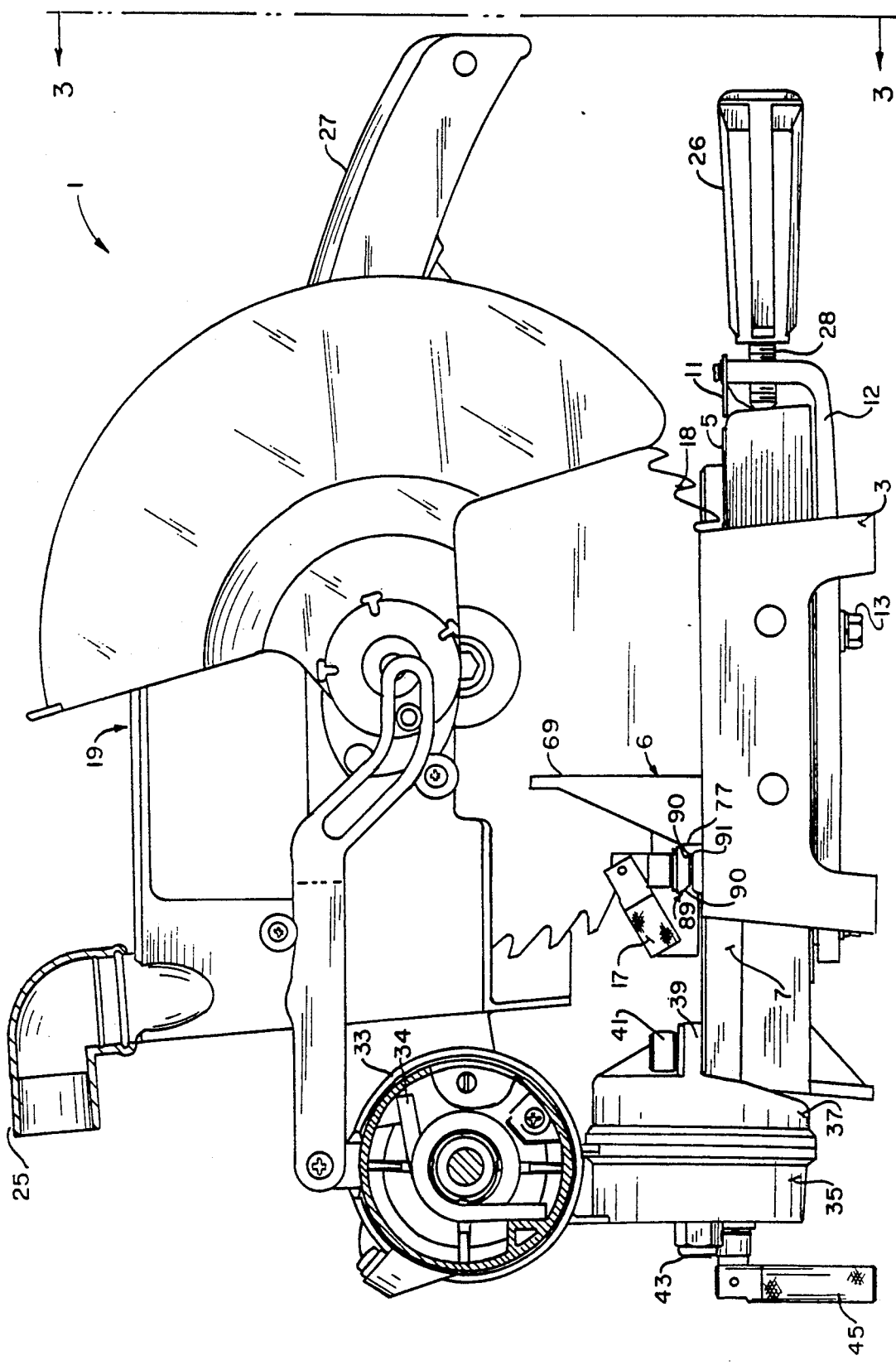
FIG. 2 is a left side elevational view of the compound miter saw.
Figure 3:
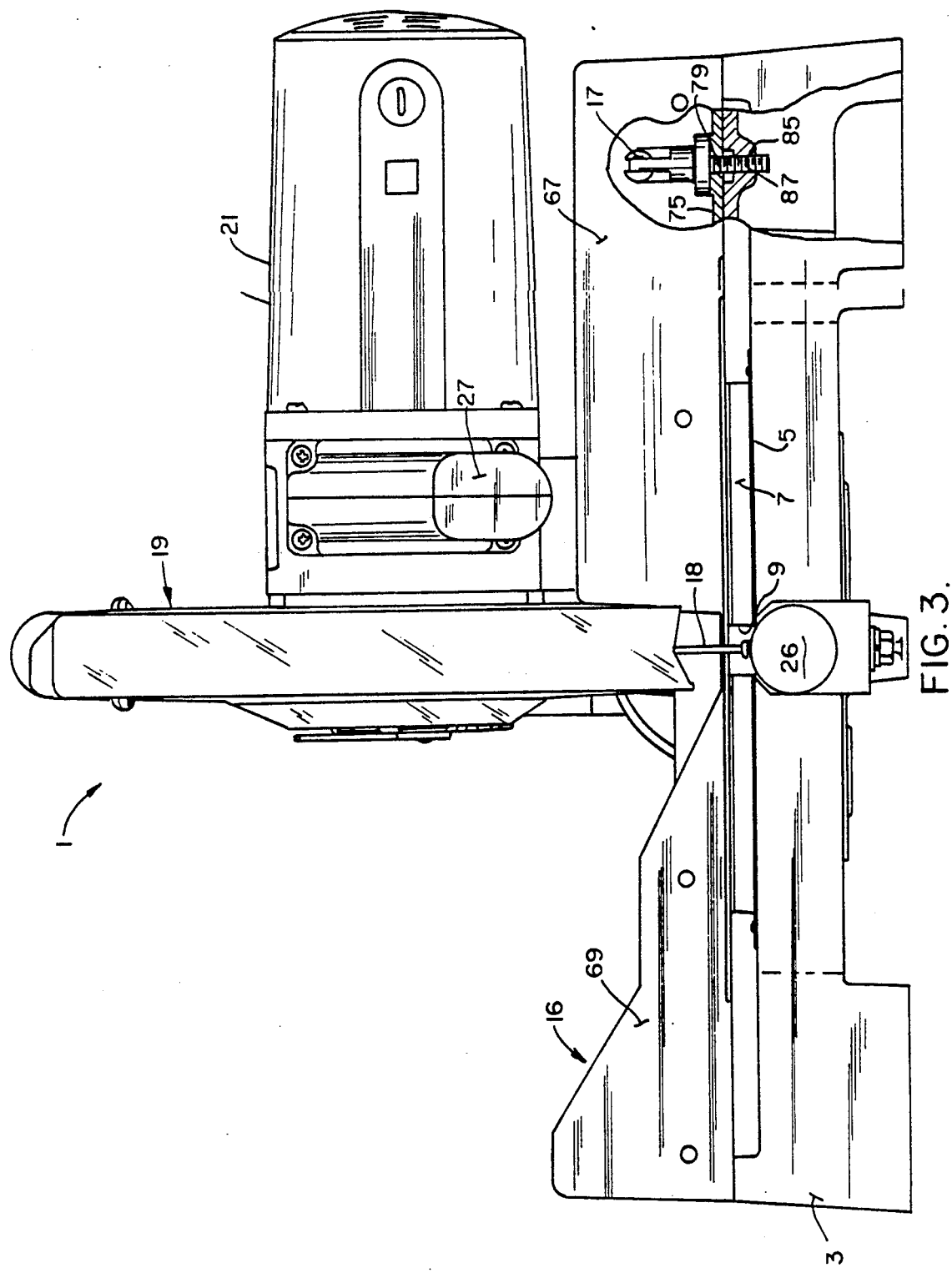
FIG. 3 is a front elevational view, partially cut away and partially in cross-section, of the compound miter saw, as viewed along line 3—3 of FIG. 2.
Figure 4:
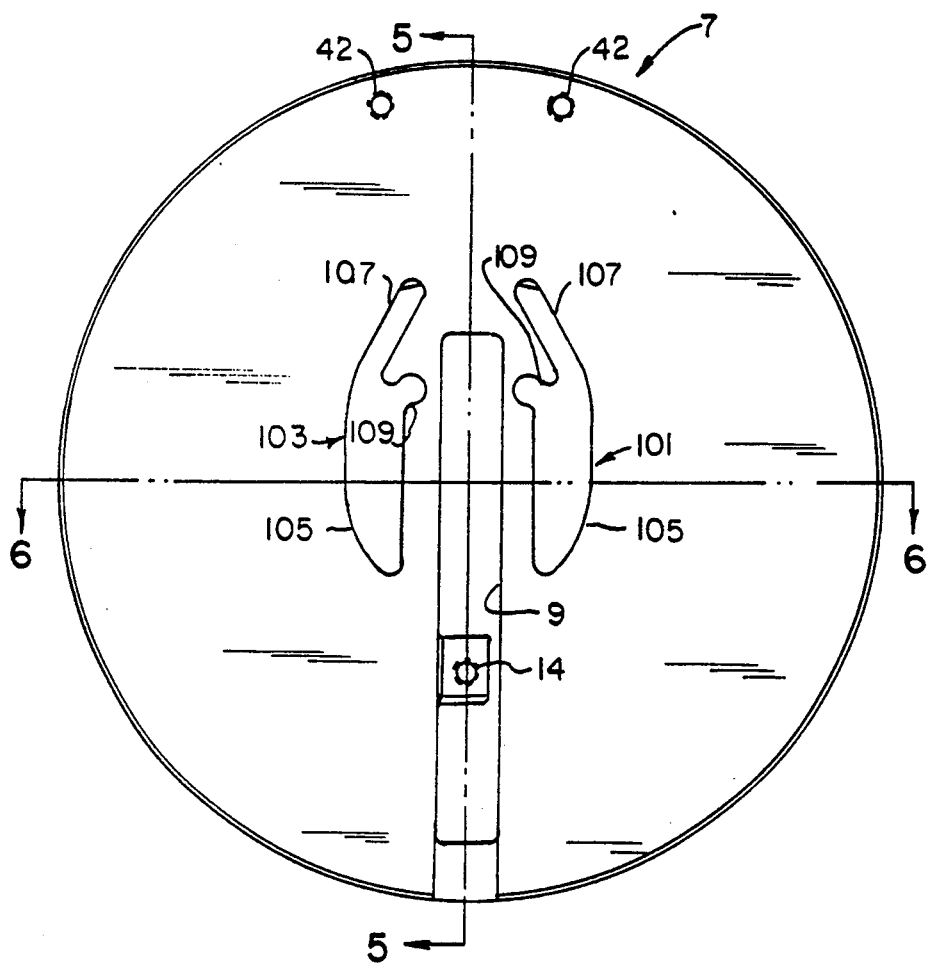
FIG. 4 is a top plan view of the turntable used with in the compound miter saw.
Figure 5:
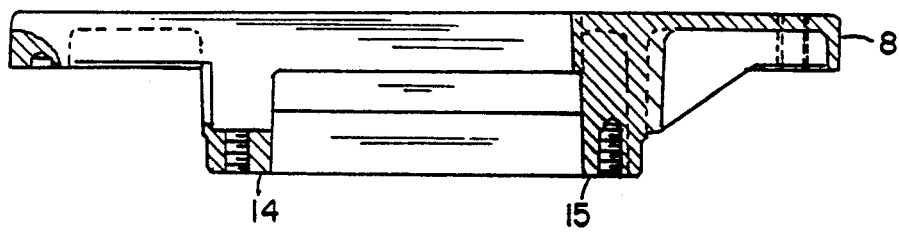
FIG. 5 is a cross-sectional view of the turntable as viewed along line 5—5 of FIG. 4.
Figure 6:
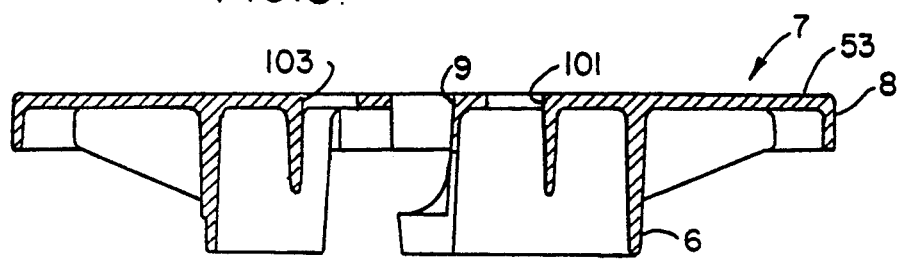
FIG. 6 is a cross-sectional view of the turntable as viewed along line 6—6 of FIG. 4.
Figure 7:
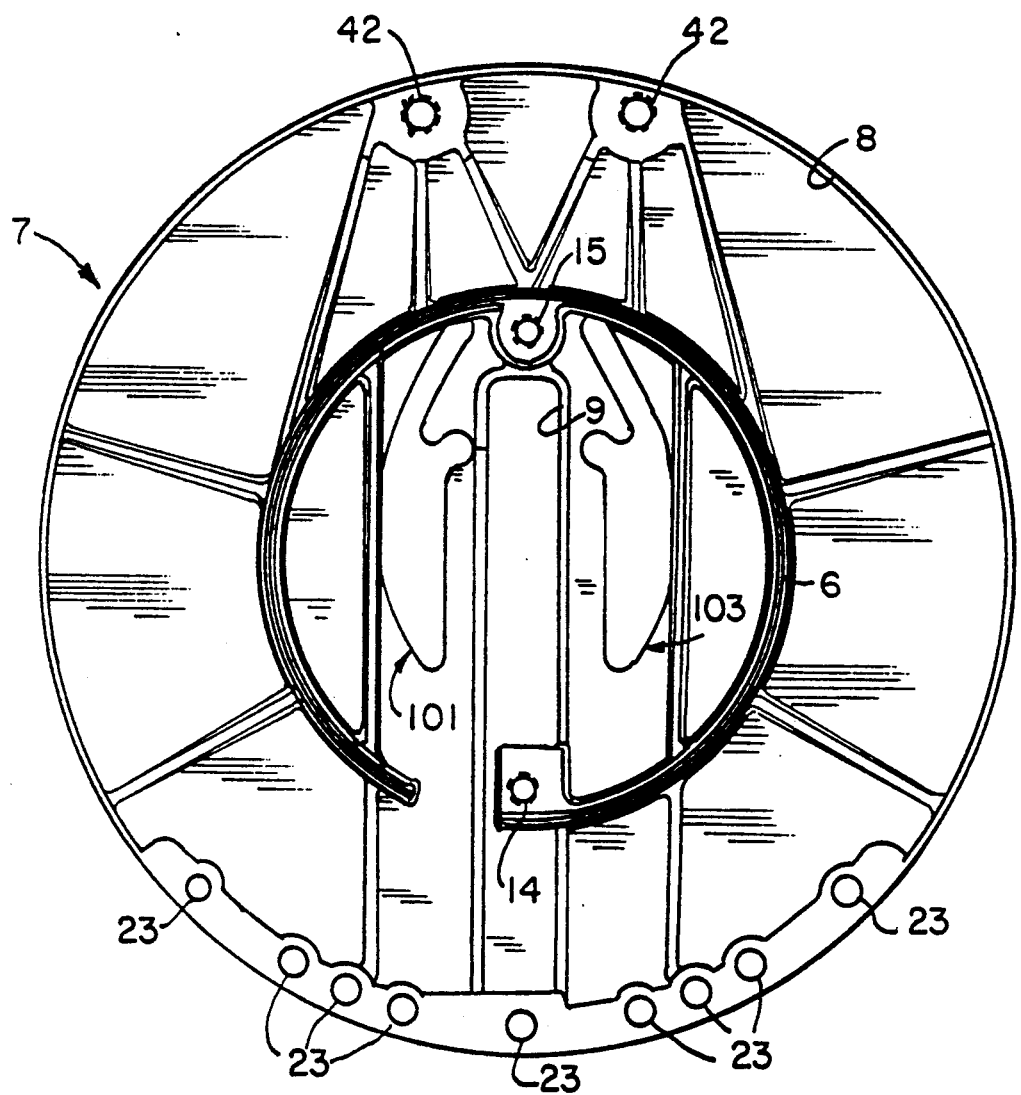
FIG. 7 is a bottom plan view of the turntable shown in FIG. 4.
Figure 8:
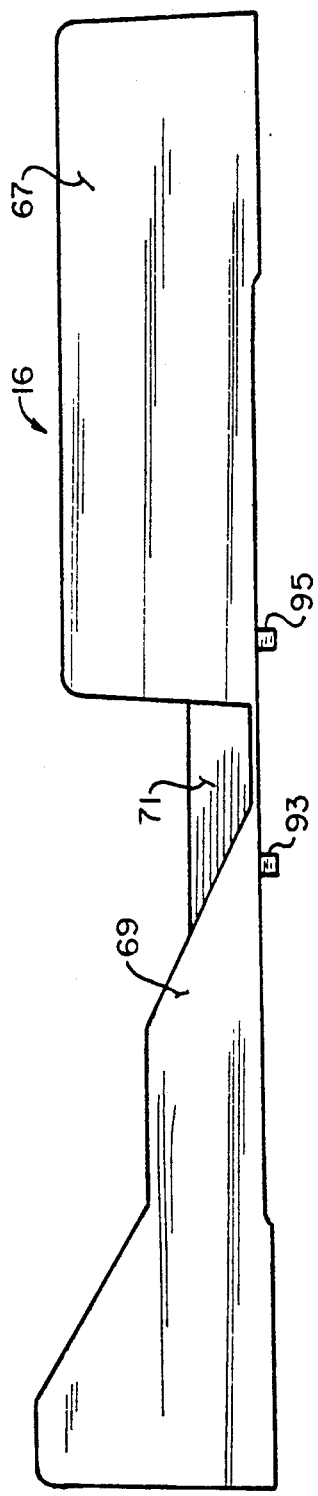
FIG. 8 is a front-elevational view of a workpiece supporting fence used in the compound miter saw.
Figure 9:
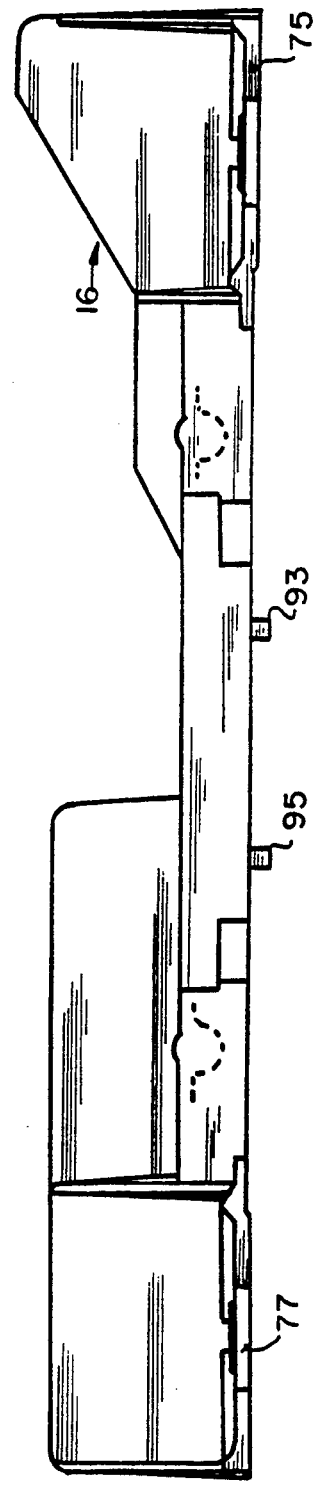
FIG. 9 is a rear elevational view of the workpiece supporting fence.

As best seen in FIGS. 1-3 of the drawings, an improved compound miter saw 1 of the present invention includes a supporting base or frame 3 having an arcuate miter scale plate 5 attached to an upper semi-circularly shaped front portion thereof for ease of use and visibility by the user. A turntable 7 is selectively rotatably mounted to the supporting frame or base 3 through a peripheral lip 8 which sits in a recess 10 in frame 3. An inner, open circular lip 6, (FIGS. 6 and 7) concentric with peripheral lip 8 engages an opening (not shown) in supporting frame 3 to further aid in rotatably mounting turntable 7 relative to frame 3. Turntable 7 is further provided with a saw blade slot 9 therein.

A miter scale pointer 11 is fixed to a miter arm 12 for use with the arcuate miter scale 5 in determining the angle of a miter cut from a fixed reference point at 0°. Miter arm 12 is fixed to turntable 7 by a pair of bolts 13 which extend through bolt holes in miter arm 12 and are received in bosses 14 and 15 in turntable 7.

A miter lock handle 26 having a set screw 28 is threadably received within miter arm 12 so that it may be tightened against turntable 7 to lock the turntable 7 in its selected miter position. Turntable 7 is also located in certain predetermined positions by a spring biased ball 22 which engages pre-selected stop holes 23 in turntable 7. Ball 22 is received in an inner boss 24 in supporting frame 3 and is held in place by a compression spring 25.

In order to hold and support workpieces in accurate aligned and squared position in the compound miter saw 1, a workpiece supporting fence 16 is provided. The workpiece supporting fence 16 includes fence lock bolt 17 for mounting the workpiece supporting fence 16 to the supporting frame 3.

A power driven saw blade 18 is rotatable mounted within an upper blade guard and housing 19, and is power driven by an electric motor 21 that is mounted to the right side of the upper blade guard and housing 19. For collecting dust and other debris generated from cut workpieces, a dust bag (not shown) may be attached to an exhaust outlet 25 at the rear of the upper blade guard and housing 19. The upper blade guard and housing 19 further includes a handle 27 for raising and lowering the power driven saw blade 18 between an upper full retract position and a lower full cut position, as desired. The handle 27 is also useful in rotating the turntable 7 as is described in aforementioned U.S. Pat. Nos. 4,934,233 and 5,042,348.

The upper blade guard and housing 19, including all other related components described above, are pivotally mounted along a pivot axis 29 for pivotally moving the power driven saw blade 18 as it is moved between its upper full retract position and its lower full cut position. The pivot axis 29 comprises a bolt which extends through an upper cylindrically shaped section 31 of the upper blade guard and housing 19, as well as through a complementary shaped interfitting and mirror image upper cylindrical section 33 (see FIG. 2). Between these two cylindrical sections 31, 33 is a confined torsional spring 34, for normally urging the upper blade guard and housing 19 and the power driven saw blade 18 to an upper, at rest position.

The upper cylindrically shaped section 33 is integrally mounted to a lower transversely extending cylindrically shaped section 35, which, in turn, is rotatably mounted relative to a pivot support 37, to allow for bevel adjustment of the compound miter saw. Specifically, the lower cylindrical section 37 includes a transverse flange 39 extending therefrom (FIG. 2) for fixedly mounting the cylindrical section 36 directly to the turntable 6 by way of bolts 41 which extend through bolt holes 42 in the turntable 7. The lower pivot support 37 is pivotally mounted to the lower cylindrical section 35 by way of a pivot bolt 43, and a bevel lock handle 45 which is threadably received in a threaded bore 47 and is loosened or tightened for movement to various positions along an elongated slot (not shown) in the lower cylindrical section 35 for relative rotatable movement to the fixed lower pivot support 37.

The rotatable lower cylindrical section 35 includes a pointer 49 for desired bevel positioning relative to a scale 51, which is attached to the outer surface of the fixed lower pivot support 37. Thus, in addition to miter cuts, the compound miter saw 1 of the present invention also provides bevel cuts by rotatably positioning the lower cylindrical section 35 relative to the fixed lower pivot support 37, as the bevel lock handle 45 is loosened and tightened to various selected positions. The desired bevel cut is visually determined by the pointer and scale 49, 51 attached respectively to the lower cylindrical section 35 and the fixed lower cylindrical section 37.

For a more specific description of the components and operation of the upper closed pivots 31, 33 and the lower closed pivots 35, 37, reference is made to above identified U.S. Pat. Nos. 4,934,233 and 5,042,348.

In light of the general understanding of the various components of the compound miter saw 1, as more fully explained in substantial detail in the above identified cross referenced issued and co-pending patent application, attention can now be focused on the specific description of the present invention including the construction and operation of the workpiece supporting fence 16 relative to the supporting frame 3 and turntable 7.

In a 10" compound miter saw, in order to cut a workpiece wider than about 5", it is necessary to position the fence behind the centerline of the table. When the saw blade and turntable are rotated to perform a miter cut, the fence must either be cut-out to clear the blade or it must move from side-to-side in order to keep the cut-out in the fence in line with the blade. According to this invention as will be described in detail below, the construction permits side-to-side motion with projections formed on the fence that engage peripheral areas of curved slots in the turntable. The slots in the turntable are thus designed to keep the cut-out in the fence in line with the blade, when the fence is in the rear position and also enables the projections to move, within the slots, without engagement of peripheral areas thereof, when the fence is in the forward position, where it does not have to move to allow proper clearance.

Workpiece supporting fence 16 is similar to the fence disclosed in U.S. Pat. No. 5,063,805. Fence 16 includes a pair of workpiece engaging surfaces 67, 69 in general alignment with each other across saw blade slot 9. Surfaces 67, 69 are joined by an arcuate interconnecting web section 71 having a fan shaped opening 73 which is adapted to be generally vertically aligned with saw blade slot 9. Thus, the saw blade 18, when in a lower full cut position, can be moved into the saw blade slot 9 without contacting the turntable 7 or workpiece supporting fence 16.

Workpiece supporting fence 16 further includes fence supporting sections 75, 77 integral with and perpendicular to workpiece engaging surfaces 67, 69. Each section 75, 77 includes a T-shaped slot 79 having a longitudinal portion 81 and a transverse portion 83. Slots 79 are aligned with threaded bosses 85 (FIG. 3) in supporting frame 3. A threaded screw 87, which is fixed beneath fence lock bolt 17, passes through longitudinal section 81 of T-shaped slot 79 and is received in boss 85 of the base or frame 3. Thus, as can be appreciated, by loosening and tightening fence lock bolt 17, the workpiece supporting fence 16 may be moved, along a path defined by the T-shaped slot longitudinal section 81, between a forward position (FIG. 14) and a rearward position (FIG. 15).

Figure 10:
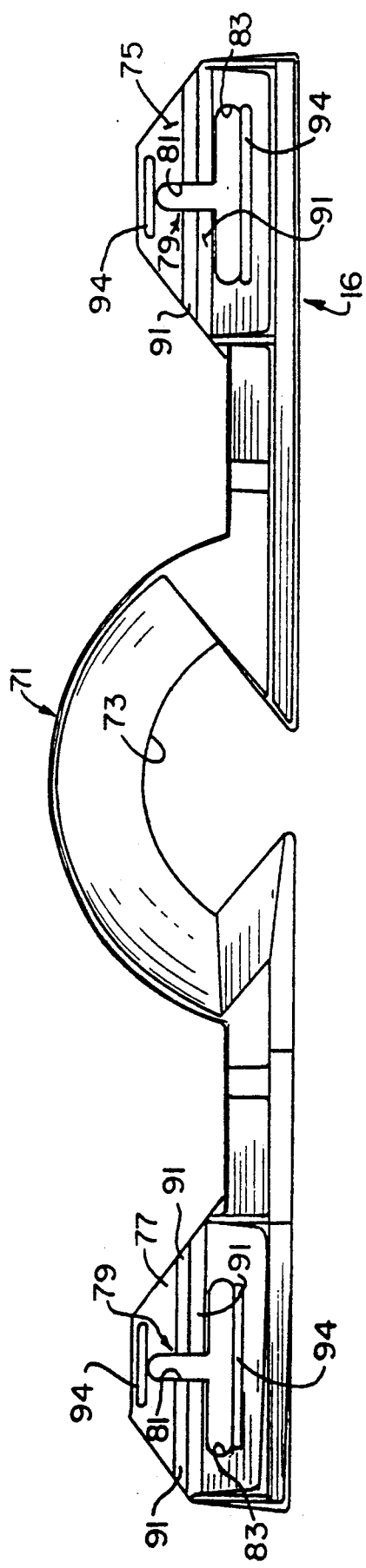
FIG. 10 is a top plan view of the workpiece supporting fence.
Figure 15:
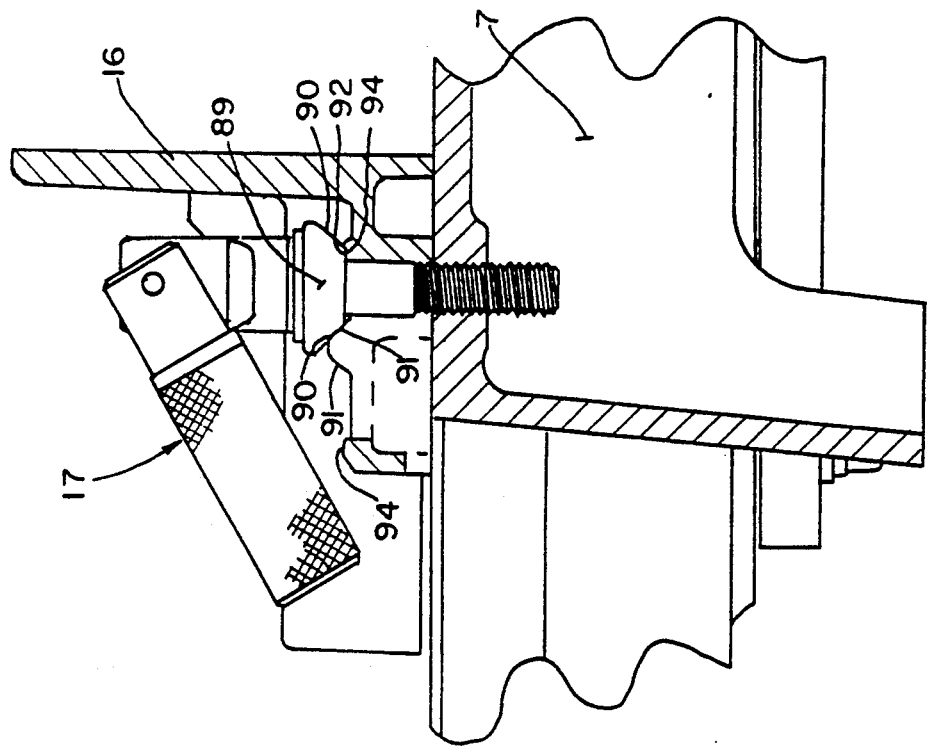
FIG. 15 is a full scale side elevational view, partly in section, of the workpiece supporting fence in a rearward position.
Figure 14:
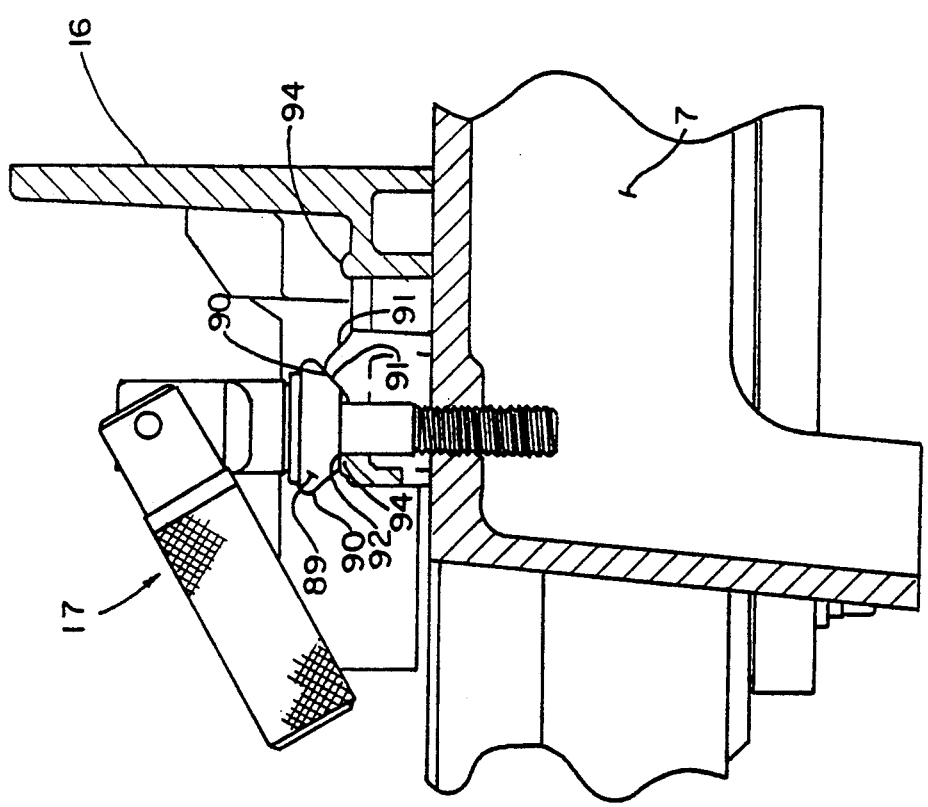
FIG. 14 is a full scale side elevational view, partly in section, of the workpiece supporting fence in a forward position.

Each fence lock bolt 17 has an associated fence clamp 89 having downwardly and inwardly beveled surfaces 90 (FIGS. 2 and 14–15). When clamped down, the beveled surface 90 of each fence clamp 89 engages a sloped wall 91 on each of the fence supporting sections 75, 77 to urge the fence 16 downwardly to aid in maintaining the fence 16 in its position under the pressures placed upon it when a workpiece is urged against workpiece engaging surfaces 67, 69. Sloped wall surfaces 91 are located adjacent the T-shaped slots 79 (FIGS. 14–15) so that beveled surfaces 90 may engage sloped walls 91 when the fence 16 is in either its forward or its rearward position. Specifically, note in FIGS. 10 and 14–15 that the sloped wall surfaces 91 are juxtaposed one another in an inverted V-shape, for engagement by the beveled or sloping surfaces 90 on each fence clamp 89.

As shown in FIG. 14, the fence 16 is shown in a forward position and FIG. 15 shows the fence 16 in a rearward position. Note in both FIGS. 14–15 how the beveled or sloping surfaces 90, on one side of the fence clamp 89, engage one of the sloping surfaces 91, depending on whether the fence 16 is in a forward or rearward position. In the forward fence position as shown in FIG. 14, the beveled or sloping surface 90, on the forward side of each fence clamp 89, engages the rear sloping surface 91, whereas in the rearward fence position as shown in FIG. 15, the beveled or sloping surface 90, on the rearward side of each fence clamp 89, engages the front sloping surface 91. To maintain the fence clamps 89 in vertically aligned position, the under surface 92 of each clamp 89 engages a supporting shoulder 94 forward or rearward of the T-shaped slots 79 (FIGS. 10 and 14–15), depending on whether the fence is in a forward or rearward position.

The purpose of the fence clamps 89 is to assure the position of the saw blade 18 to the fence 16 miter angle when the fence 16 is locked in place. The sloping surfaces 91 on the fence 16 match the beveled or sloping surfaces 90 on the fence clamp 89, forcing the fence into a consistent position when the fence clamps 89 are tightened. Thus, the beveled sloping surfaces 90 and the fence clamp 89 and complementary sloping surfaces 91 on the fence 16 provide a repeatable and controllable stop for the fence 16. Also, the fence is restrained from longitudinal or lateral movement, when the fence clamps 89 are in tightened position.

The fence 16 is moved between its forward and rearward positions, along the longitudinal section 81 of T-shaped slot 79, by simply releasing the fence lock bolt 17 and then re-tightening same when the fence 16 is in the desired forward or rearward position. A user will typically select the rearward position, when the workpiece is wider than about 5", since it is necessary to position the fence 16 behind the center of the turntable 7.

Figure 11:
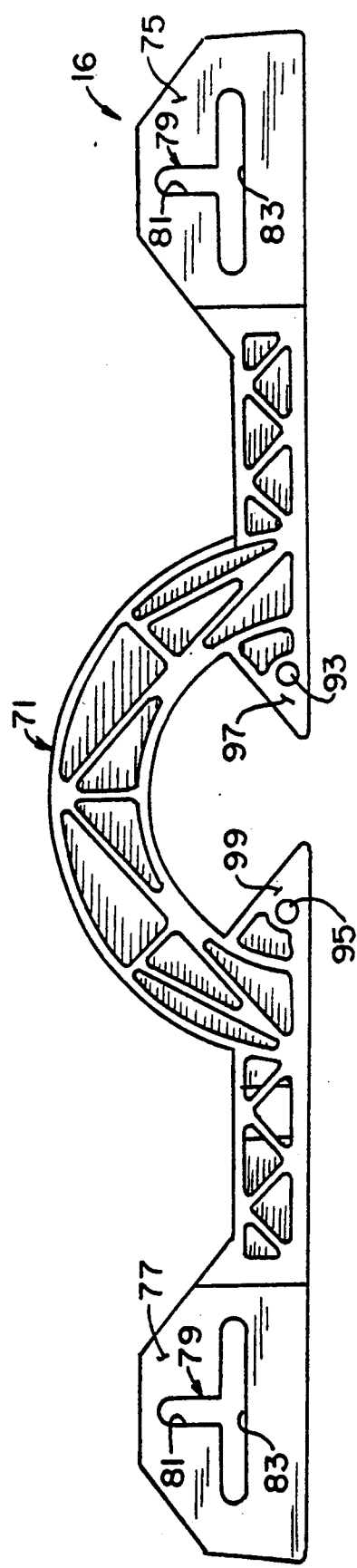
FIG. 11 is a bottom plan view of the workpiece supporting fence.

Workpiece supporting fence 16 also includes downwardly directed pins 93, 95, which are fixed to inner portions 97, 99 on the underside of fence 16 (FIG. 11). As shown in FIGS. 12A-12C and 13A-13C, pins 93, 95 are positioned within a pair of elongated generally parallel slots 101, 103 formed in turntable 7, there being one slot on either side of saw blade slot 9. Each slot 101, 103 includes a wide lower portion 105, an elongated narrow inwardly directed curvilinear slot 107 at an opposite end of lower portion 105 extending laterally beyond the inner end of saw blade slot 9, and a short inwardly directed stub slot 109 which is positioned inwardly relative to curvilinear slot 107 adjacent the opposite end of the lower wider portion 105.

Reference is now made to FIGS. 12A-12C and 13A-13C for a specific description of how the fence 16 is both longitudinally and transversely adjustable relative to the saw blade 18.

Figure 12C:
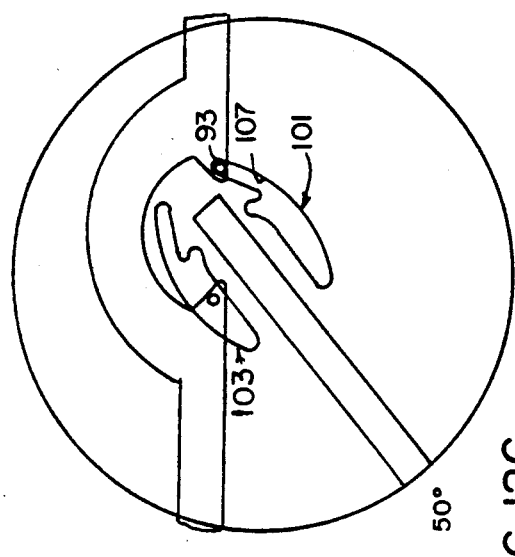
FIGS. 12A–12C are diagrammatic views demonstrating the side-to-side movement of the workpiece supporting fence with respect to the turntable, the fence in a rearward position, and also showing the fence as it is rotated from a −50° to 0° to +50° miter angle.
Figure 12B:
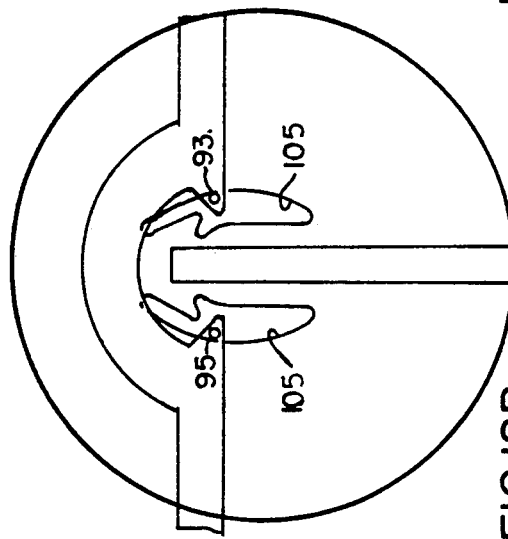
Figure 12A:
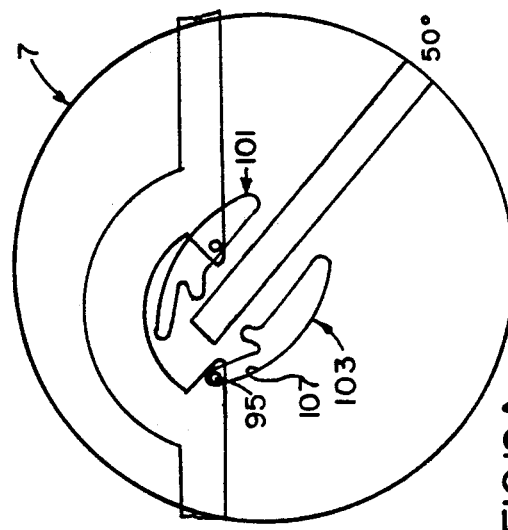

As shown in FIGS. 12A-12C, when the workpiece supporting fence 16 is in its rearward position and the turntable 7 is rotated, one of pins 93, 95 will engage peripheral areas of associated curvilinear slot 107, of one of the slots 101, 103, to move the fence 16 from side-to-side, in order to prevent the saw blade 18 from contacting fence 16. Also, with fence 16 in its rearward position, the transverse portion 83 of T-shaped slot 79 is aligned with lock handle screw 87. Thus, the transverse portion 83 of the T-shaped slot 79 provides a path along which fence 16 moves as its is urged from side-to-side by the rotation of turntable 7 in conjunction with fence pins 93, 95.

Figure 13C:
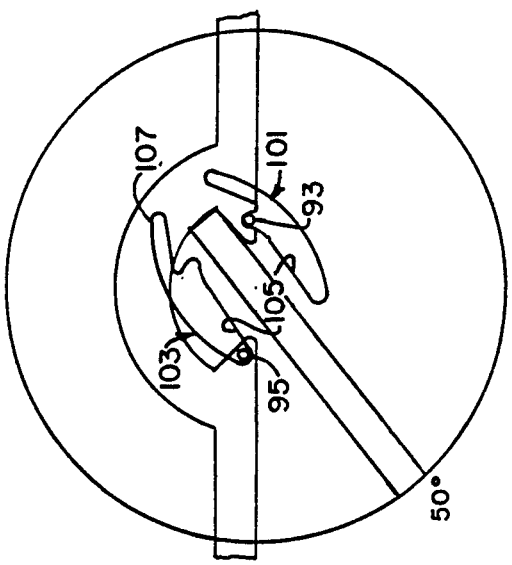
FIGS. 13A–13C are diagrammatic views similar to those of FIGS. 12A–12C, but With the Workpiece supporting fence in a forward position.
Figure 13B:
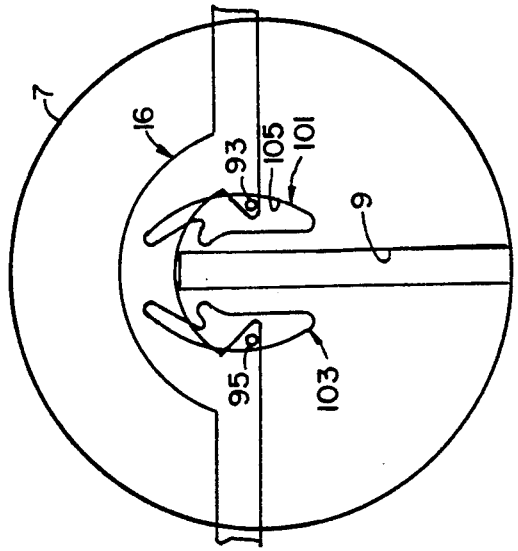
Figure 13A:
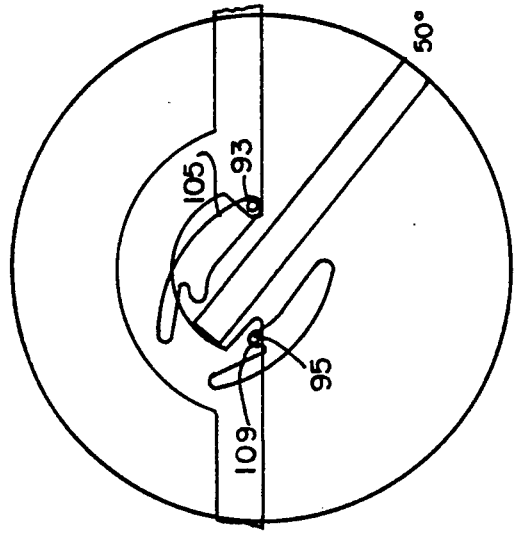

When fence 16 is in its forward position, as is depicted in FIGS. 13A-13C, the side-to-side motion of fence 16 is not necessary. The fence is aligned across the center (diameter) of the turntable and the center of the arcuate web section 71 is aligned with respect to the axis of rotation of the turntable 7, saw blade slot 9, and saw blade 18. Thus, saw blade 18 will not contact fence 16 as the turntable 7 is rotated to produce various miter cuts. In the forward fence position, lock handle screw 87 is within the vertical section 81 of T-shaped slot 79. As turntable 7 is rotated, slots 101 and 103 move relative to pins 93, 95. Thus, portions 105 of slots 101 and 103 are sufficiently wide so that the pins 93, 95 are not engaged by the peripheral areas surrounding the slots and the fence 16 will not move. As can be seen in FIGS. 13A and 13C, when the turntable 7 is rotated to one of its extreme positions, one of the pins 93, 95 is received within stub portion 109 of slot 101 or 103 and the other pin is positioned at the bottom of its associated slot.

From the foregoing, it will be apparent that pins 93, 95, turntable slots 101, 103 and T-shaped slots 79 work together to automatically transversely move the fence 16 relative to the saw blade 18, when it is in a rearward position. The fence 16 can also be longitudinally adjusted relative to the saw blade 18, by releasing the fence lock bolt 17, so as to untighten the threaded screw 87 attached to each fence lock bolt 17 for unthreading same relative to the base or frame 3. This enables the fence 16 to be moved within the longitudinal slots 81 of the T-shaped slots 79. As a result, the fence 16 can be moved from the rearward to the forward position and vice versa. In its forward position, the fence 16 is aligned across the center of the turntable 7, thereby enabling re-positioning of the saw blade in various miter positions, without requiring transverse movement of the fence 16, as explained above.

Numerous variations, within the scope of the appended claims, will be apparent to those skilled in the art in light of the foregoing description and accompanying drawings.

I claim:

1. A miter saw apparatus comprising a supporting frame, a turntable selectively rotatably mounted on said supporting frame, a power driven saw blade pivotally mounted on said turntable, said turntable having a saw blade slot for receiving the power driven saw blade therein, a workpiece supporting fence mounted on said supporting frame, said workpiece supporting fence including a pair of workpiece engaging surfaces in general alignment with each other across the saw blade slot, means for moving said workpiece supporting fence relative to said turntable between a forward position i general alignment with the center of said turntable and a rearward position behind the center of said turntable independent of rotation of said turntable and without removing said workpiece supporting fence from said supporting frame, means for locking and unlocking said workpiece supporting fence relative to said supporting frame in both said forward and rearward positions, said workpiece supporting fence in its forward position causing the pair of workpiece engaging surfaces thereof to be in general alignment with the center of the turntable, said workpiece supporting fence in its rearward position causing the pair of workpiece engaging surfaces thereof to be positioned behind the center of the turntable, and means for automatically transversely moving said workpiece supporting fence relative to said power driven saw blade as said turntable is rotated and when said workpiece supporting fence is in a rearward position, so as to maintain said workpiece supporting fence in a predetermined position relative to said power driven saw blade as said turntable and included power driven saw blade are selectively rotated on said supporting frame to various desired miter positions.

2. The miter saw as defined in claim 1 wherein said means for moving said workpiece supporting fence between a forward and rearward position relative to said power driven saw blade includes spaced cooperating stud and slot means connected between said turntable and workpiece supporting fence at opposite ends of said workpiece supporting fence.

3. The miter saw as defined in claim 2 wherein said spaced cooperating slot means are part of a T-shaped slot formed at opposite ends of said workpiece supporting fence.

4. The miter saw as defined i claim 2 wherein each said cooperating stud means is part of a fence lock that extends through said cooperating slot means and is threadably received within a boss formed in said supporting frame.

5. The miter saw as defined in claim 4 wherein said workpiece supporting fence further includes a fence supporting section for each workpiece engaging surface, each said fence supporting section including a T-shaped slot at opposite ends of said workpiece supporting fence.

6. The miter saw as defined in claim 5, wherein said workpiece supporting fence further includes sloped wall sections adjacent each said T-shaped slot, said sloped wall sections being engaged by a beveled surface extending from a clamp on said fence lock.

7. The miter saw as defined in claim 1 wherein said means for automatically transversely moving said workpiece supporting fence relative to said power driven saw blade as said turntable is rotated and when said workpiece supporting fence is in a rearward position includes spaced cooperating pin and slot means and spaced cooperating stud and slot means.

8. The miter saw as defined in claim 7 wherein said spaced cooperating pin and slot means includes a pair of spaced pins which extend downwardly from said workpiece supporting fence which are positioned within spaced slot means formed in said turntable.

9. The miter saw as define din claim 8 wherein said spaced cooperating stud and slot means include a releasable fence lock extending through a T-shaped slot at opposite ends of said workpiece supporting fence.

10. The miter saw as defined in claim 9 wherein each of the slot means formed in the turntable include a wide portion at one end, a curvilinear portion at an opposite end of said wide portion which extends to a point longitudinally beyond an inner end of said saw blade slot, and a stub portion adjacent to each curvilinear portion and also being inwardly directed relative to a corresponding stub portion of said other slot means.

11. The miter saw as defined in claim 10 wherein one of said pins engage peripheral areas of said slot means in causing said automatic transverse movement of said workpiece supporting fence when located in the rearward position.

12. The miter saw as defined in claim 1 wherein said transverse moving means comprises a pair of pins projecting downwardly form the bottom of said workpiece supporting fence and a cooperating pair of elongated slot sin said turntable together with a pair of spaced cooperating stud elements extending between said workpiece supporting fence and said supporting frame which are received within T-shaped slots formed at opposite ends of said workpiece supporting fence, said turntable slots being generally parallel with and positioned on either side of said saw blade slot, each said elongated turntable slot having a wide portion at one end and a curvilinear portion at an opposite end of said wide portion which is inwardly directed relative to a corresponding curvilinear portion of said other slot means and extends towards and longitudinally beyond an inner end of said saw blade slot, a stub portion adjacent to each curvilinear portion and also being inwardly directed relative to a corresponding stub portion of said other slot means, both said inwardly directed curvilinear portion and said inwardly directed stub portion being positioned adjacent the opposite end of said wide portion, one of said pins engaging peripheral areas of one of said curvilinear slots when said fence is in its rearward position to transversely move said fence along a path defined by said cooperating studs and T-shaped slots as said turntable and saw blade are rotated to various desired miter positions, said pins moving within said slots without engaging peripheral areas thereof when said fence is in its forward position to allow said turntable and saw blade to be rotated to various desired miter positions without transversely moving said workpiece supporting fence.

13. The miter saw as defined in claim 12 wherein said workpiece supporting fence includes a fence supporting surface each end of which is provided with said T-shaped slot, said T-shaped slot including an elongated transverse slot defining a path along which said fence moves as it is transversely moved by the engagement of said fence pins along peripheral areas of said turntable slots.

14. The miter saw as define din claim 13 including workpiece supporting fence longitudinal moving means which comprises longitudinal slots forming part of the T-shaped slots in fence supporting surfaces of said workpiece supporting fence, and a fence lock including a stud element which extends through each of said longitudinal slots to be threadably received i a boss in said supporting frame, whereby upon loosening said fence lock, said fence may be longitudinally moved along a path defined by said longitudinal slot without removing said fence from said supporting frame.

15. The miter saw as defined in claim 14 wherein said longitudinal slot defines a path along which said fence can move between a forward and a rearward position, and each said fence lock locks said fence in one of said forward and rearward positions.

16. A miter saw apparatus comprising a supporting frame, a turntable selectively rotatably mounted on said supporting frame, and a power driven saw blade pivotally mounted on said turntable and received in a saw blade slot in said turntable, a workpiece supporting fence mounted on said supporting frame including a pair of workpiece engaging surfaces generally aligned with each other across the saw blade slot and a fence supporting section perpendicular to and attached to each of said workpiece engaging surfaces, each said fence supporting section including a slot extending generally transverse to said workpiece supporting fence, each said slot receiving a fence lock therethrough which is received in a boss in said supporting frame to lock said fence in locked and unlocked position, and each said slot allowing said fence to be moved between a forward position in general alignment with the center of the turntable and a rearward position behind the center of the turntable independent of rotation of said turntable and without removing said fence from said supporting frame when said lock is unlocked, said fence lock being adapted to lock said fence in along said slot as desired.

17. The miter saw as defined in claim 16 wherein said turntable further includes a pair of openings, there being one opening on each side of said saw blade slot, and said fence further including a slot extending generally parallel to said workpiece supporting fence in each of said fence supporting sections and a pair of downwardly directed pins which are positioned within said turntable openings.

18. The miter saw as defined in claim 17 wherein each of said turntable openings includes a curvilinear section directed towards said saw blade slot which is engaged by one of said pins as said turntable is rotated, such that when said fence is in its rearward position, said curvilinear section, by engagement with said pins, causes said fence to be transversely moved along a path defined by said transverse slot.

19. A miter saw apparatus comprising a supporting frame, a turntable selectively rotatably mounted on said supporting frame, a power driven saw blade pivotally mounted on said turntable, said turntable having a saw blade slot for receiving the power driven saw blade therein a pair of elongated openings, one said opening on each side of said slot, a workpiece supporting fence mounted on said supporting frame and including a pair of workpiece engaging surfaces in general alignment across the saw blade slot, said workpiece supporting fence including a pair of spaced pins, one said pin extending into each said opening and engaging peripheral areas forming each said opening in said turntable for transversely moving said workpiece supporting fence relative to said saw blade.

20. The miter saw of claim 19 wherein said openings are generally parallel with each other and with said saw blade slot, there being one opening on either side of said saw blade slot, said openings each including a wide portion at one end, a narrow curvilinear portion extending toward said saw blade slot at an opposite end of said wide portion which extends laterally beyond an inner end of said saw blade slot and a stub portion adjacent the opposite end of said wide portion which extends toward said saw blade slot and located on an inside portion of said curvilinear portion, whereby when said fence is in a rearward position, one of said pins engages peripheral areas of its associated curvilinear portion to transversely move said fence as said turntable is rotated and when said fence is in a forward position, the peripheral areas of associated curvilinear portions are not engaged such that said faence is not moved as said turntable is rotated.

21. The miter saw of claim 20 wherein said fence further includes spaced fence supporting sections each having a transverse slot, said transverse slot defining a path along which said fence moves as it is moved by the combined action of peripheral areas of said turntable openings and said fence pins.

22. In a miter saw apparatus having a supporting frame, a turntable selectively rotatably mounted on said supporting frame, a power driven saw blade pivotally mounted on said turntable, said turntable having a saw blade slot for receiving the power driven saw blade therein, a workpiece supporting fence mounted on said supporting frame, said workpiece supporting fence including a pair of workpiece engaging surfaces in general alignment with each other across the saw blade slot, the improvement comprising: means for moving said workpiece supporting fence between a forward position in general alignment with the center of the turntable and a rearward position behind the center of the turntable independent of rotation of said turntable and without removing said workpiece supporting fence from said supporting frame, means for locking and unlocking said workpiece supporting fence relative to said supporting frame in both said forward and rearward positions, said workpiece supporting frame i its forward position causing the pair of workpiece engaging surfaces thereof to be in general alignment with the center of the turntable, said workpiece supporting fence in its rearward position causing the workpiece engaging surfaces thereof to be positioned behind the center of the turntable, and means for automatically transversely moving said workpiece supporting fence relative to said power driven saw blade as.said turntable is rotated and when said workpiece supporting fence is in said rearward position, so as to maintain said workpiece supporting fence in a predetermined position relative to said power driven saw blade as said turntable and included power driven saw blade are selectively rotate don said supporting frame to various desired miter positions.

* * * * *

UNITED STATES PATENT AND TRADEMARK OFFICE
CERTIFICATE OF CORRECTION

PATENT NO. : 5,181,448
DATED : January 26, 1993
INVENTOR(S) : Daniel A. Terpstra It is certified that error appears in the above-identified patent and that said Letters Patent is hereby corrected as shown below:

Column 1, line 20 is "movement for saw blade as",
  Should be -- movement for maintaining the fence in one position relative to a power driven saw blade as --;

Claim 1, column 8, line 33 is "position i",
  Should be -- position in --;

Claim 4, column 8, line 67 is "defined i claim",
  Should be -- defined in claim --;

Claim 9, column 9, line 27 is "as define din claim",
  Should be -- as defined in claim --;

Claim 12, column 9, line 46 is "downwardly form the",
  Should be -- downwardly from the --;

Claim 12, column 9, line 48 is "slot sin said",
  Should be -- slots in said --;

Claim 14, column 10, line 17 is "as define din",
  Should be -- as defined in --;

Claim 14, column 10, line 23 is "received i a boss",
  Should be -- received in a boss --;

Claim 19, column 11, line 16 is "peripheral areas forming",
  Should be -- peripheral surfaces forming--

UNITED STATES PATENT AND TRADEMARK OFFICE
CERTIFICATE OF CORRECTION

PATENT NO. : 5,181,448

DATED : January 26, 1993

INVENTOR(S) : Daniel A. Terpstra

It is certified that error appears in the above-identified patent and that said Letters Patent is hereby corrected as shown below:

Claim 20, column 11, line 35 is "said faence",
 Should be -- said fence --;

Claim 22, column 12, line 23 is "frame i its",
 Should be -- frame in its --; and Claim 22, column 12, line 36 is "selectively rotate don",
 Should be -- selectively rotated on --.

Signed and Sealed this

Eleventh Day of January, 1994

Attest:

BRUCE LEHMAN

Attesting Officer    Commissioner of Patents and Trademarks